No. 871,331. PATENTED NOV. 19, 1907.
E. W. FRAASCH.
DEVICE FOR PICKING UP LODGED OR BATTERED DOWN GRAIN.
APPLICATION FILED MAR. 29, 1907.
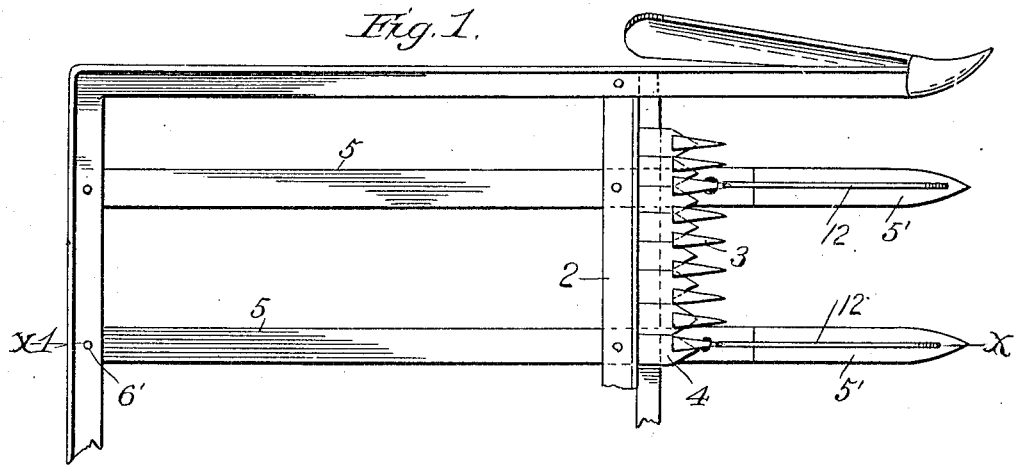
Fig. 1.
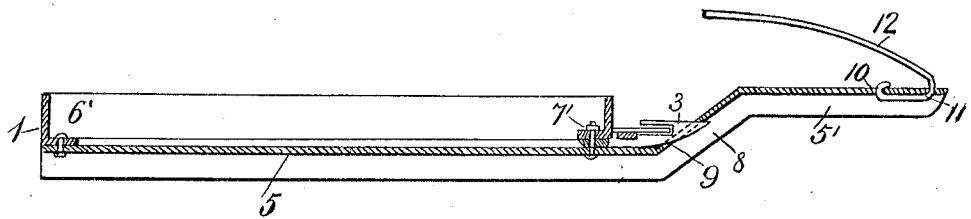
Fig. 2.
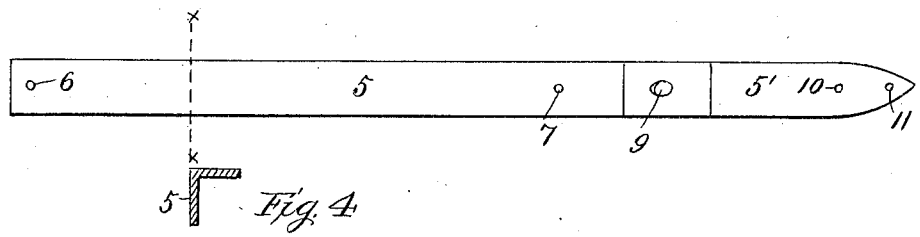
Fig. 3.
Fig. 4.
Witnesses
F. L. Ourand
B. C. Trott
E. W. Fraasch, Inventor
By John S. Duffie, Attorney

UNITED STATES PATENT OFFICE.

EWALD W. FRAASCH, OF BELLINGHAM, MINNESOTA.

DEVICE FOR PICKING UP LODGED OR BATTERED-DOWN GRAIN.

No. 871,331.  Specification of Letters Patent.  Patented Nov. 19, 1907.

Application filed March 29, 1907. Serial No. 365,328.

*To all whom it may concern:*

Be it known that I, EWALD W. FRAASCH, a citizen of the United States, residing at Bellingham, in the county of Lac qui Parle and State of Minnesota, have invented certain new and useful Improvement in Devices for Picking Up Lodged or Battered-Down Grain, of which the following is a specification.

My invention is a device for picking up lodged or battered down grain, and is attached to a grain harvester.

My device consists of a piece of angle steel, which is fastened to the under side of a harvester platform, the front end extending forward and having extending from its extreme front end a spring wire running backwardly.

In the accompanying drawing, Figure 1, is a top view, showing part of a harvester platform. Fig. 2, is a longitudinal sectional view on the line x x, of Fig. 1. Fig. 3, is a top face view, with the spring removed. Fig. 4, is a cross sectional view of Fig. 3, on the line x x.

My invention is described as follows:—

The numeral 1, represents the rear sill of a harvester platform; 2, represents the front sill; 3, represents the guard projections and 4, represents the cutting blade; 5, represents my pick-up fingers; these fingers are all alike, and there may be as many as six of these pick-up fingers attached to each harvester platform. There may be as many pick-up fingers as necessary; it depends upon the size of the machine and the condition of the grain; if grain is badly lodged it will be necessary to have the pick-up fingers every eight or nine inches apart, while where it is not so bad, every fifteen or eighteen inches may be enough. These pick-up fingers are made of angle steel, the rear part of which is provided with a perforation 6, and is secured by a bolt $6^1$, or otherwise, to the rear sill, and near its center with another perforation 7, by means of which it is secured by a bolt $7^1$, or otherwise to the front platform sill. Just a little distance in front of this last mentioned perforation 7, there is an upward bend 8, of about three inches or more in length of said finger, and near the forward part of said upward bend 8, is a perforation 9, and from the forward end of said upward bend, said finger extends forwardly on a horizontal line and parallel to the line of its rear part. This rise or upward bend 8, must not be higher than the canvas on the platform; it depends on the make of the machine. One of the teeth 3, of the blade-guard passes into said perforation 9, and with the assistance of the bolts $6^1$ and $7^1$, holds said finger firmly in place. Near the front end of said finger are two perforations 10 and 11; a spring wire 12, has its lower rear end secured in the perforation 10; said wire then passes forwardly under said finger; then upwardly through the perforation 11, and then abruptly backwardly and upwardly at an angle of about 30 degrees until its rear end is nearly immediately over the perforations 9, of the pick up fingers.

The reel of the harvester is to be adjusted so as to touch or come close to said spring 12, which raises the down grain, and the reel catches it and brings it on to platform to be taken away by the canvas.

Having described my invention, what I claim as new and desire to secure by Letters Patent, is:—

1. The combination of the rear and front platform sills 1 and 2; pick-up finger, consisting of a piece of angle steel 5, having an upward bend 8, provided with a perforation 9; a horizontal extension $5^1$, provided with perforations 10 and 11; a rear extension provided with perforations 6 and 7; bolts and nuts $6^1$ and $7^1$, securing said rear extension to the rear and front platform sills, respectively; guard projection 3, fitting into said perforation 9; spring wire 12, secured in perforations 10 and 11, running thence backwardly and upwardly to a point immediately over said guard projection 3, substantially as shown and described and for the purposes set forth.

2. In combination with a harvester platform, a pick-up finger, consisting of a bar of steel having a rear horizontal part 5; an upward bend 8, and forward projection $5^1$, said rear part provided with perforations 6 and 7, said upward bend 8 provided with perforation 9, said forward extension with perforations 10 and 11, and a spring wire secured to the front end of said finger, extending upwardly and backwardly, the rear part of said bar secured to the under side of said platform, guard projection 3, secured in said perforation 9, substantially as shown and described and for the purposes set forth.

In testimony whereof I affix my signature, in presence of two witnesses.

EWALD W. FRAASCH.

Witnesses:
H. C. ROSENWALD,
FRANK A. CHELBERG.